May 28, 1968     J. D. BRINKMAN     3,386,029
PHASE CONVERTER UTILIZING AMPLIFIERS AND FEEDBACK MEANS
Filed June 28, 1966
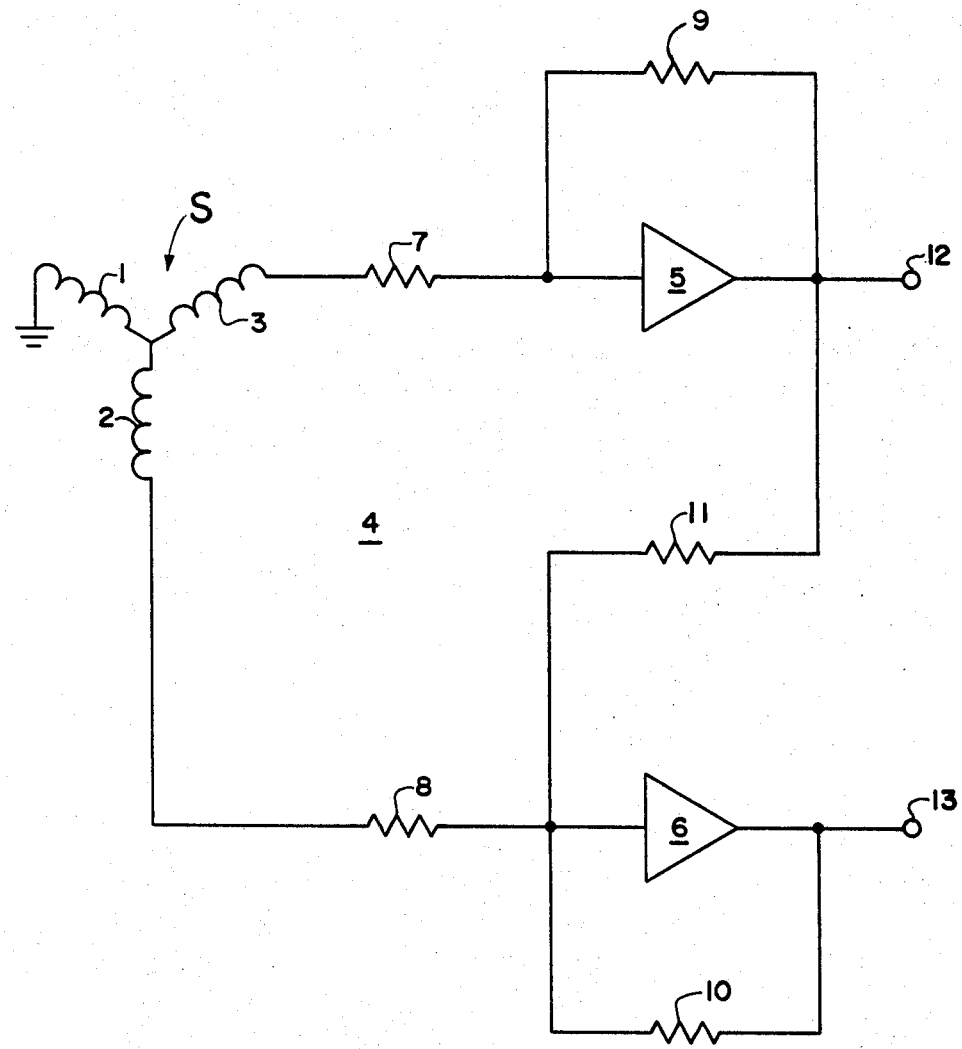
INVENTOR.
JOHN.D. BRINKMAN
BY
   *Karl A. Ohralik*
ATTORNEY United States Patent Office 3,386,029
Patented May 28, 1968

3,386,029
PHASE CONVERTER UTILIZING AMPLIFIERS
AND FEEDBACK MEANS
John D. Brinkman, Pine Brook, N.J., assignor to General
Precision Inc., Little Falls, N.J., a corporation of
Delaware
Filed June 28, 1966, Ser. No. 561,154
4 Claims. (Cl. 321—54)

This invention relates to electrical translator circuitry and, more particularly, to phase conversion systems effective to translate information from three position-phase potentials to two position-phase potentials.

In many control systems, angular positions of elements, such as shafts, etc., are electrically designated by signals produced by synchro control transmitters. Typically, such control transmitters comprise a stator having three equally spaced, stationary electrical windings and a rotor with a single electrical winding rotatable with respect to the stator windings. The rotor winding is excitable by some alternating potential and a shaft or other element, whose orientation is to be indicated, is geared to the rotor so as to orient it directly or proportionally to the orientation of such a shaft. In this relationship, the orientation of the shaft and rotor results in output potentials produced by the three stator windings which are an indication of the shaft position. For example, when the rotor is excited by a sinusoidal potential, the three stator windings will produce potentials of $E \sin wt \sin \theta$, $E \sin wt \sin (\theta+120°)$ and $E \sin wt \sin (\theta+240°)$, wherein E represents the amplitude of the sinusoidal wave, $w$ represents the frequency of the sinusoidal excitation wave, $t$ represents time and $\theta$ represents the angle between the shaft position and some reference position.

Control transmitters of the resolver type, having a pair of stator windings disposed 90° with respect to each other and a rotor winding rotatable with respect thereto for producing output potentials proportional to sine and cosine of the displacement angle, are also utilizable in such control systems. However, the three wire synchros possess certain inherent advantages as control transmitters. The three wire synchro inherently eliminates even harmonics and all harmonics that are integral multiples of three. As a consequence, the use thereof is more extensive. On the other hand, only two signals indentifying the shaft angle in the form of sine and cosine of the angle of the shaft with respect to some reference position are adequate and in many control circuits are preferable over three wire signals. Consequently, translation of information with respect to the shaft angle from three phase systems to two phase systems are useful and afford the use of the preferred type of component in both cases.

Translation from such three wire, three phase systems to two phase systems has been effected with considerable success by the use of the Scott T transformer. The Scott T, however, is somewhat sensitive to null harmonics and to other noise. Also, certain associated circuitry, such as buffer amplifiers required with the Scott T unit, require careful stabilization.

Accordingly, it is a principal object of this invention to facilitate conversion of three phase potentials into two phase potentials with reduced sensitivity to noise and null harmonics and with circuitry that is easier to stabilize.

It is another object of this invention to achieve conversion of three phase potentials into two phase potentials by use of a completely solid state apparatus.

In accordance with this invention, these and other objects and advantages are facilitated by a pair of phase inverting, summing amplifiers; a first one of which receives as its input, the output of one line of a three phase system, and the second one of which receives as its two inputs, another output of the three phase system and the output of the first phase inverting amplifier. Each amplifier has a feedback loop from output to input. By proper proportioning of the coupling between amplifiers and of the feedback coupling so that the feedback coupling of the second is $\sqrt{3}/2$ times the feedback coupling of the first, and the cross-coupling from the first to the second is ½ that of the feedback coupling of the first, output signals of equal magnitude are derived which are proportional to the sine and cosine, respectively, of the shaft angle or position of other element. Since the feedback coupling between amplifiers is resistive, the resistors will have ratios of resistance which are respectively the inverse of the above.

Other and further objects and advantages of the invention will become apparent from the following detailed description thereof taken with the accompanying drawings in which:

The single figure is a schematic representation of the invention.

Referring now more particularly to the drawings for a detailed description of the invention, S represents a typical synchro having three stator windings 1, 2 and 3 and a rotor, not shown, having a winding rotatable relative to each of these stator windings. The rotor winding in response to appropriate excitation produces potentials which are proportional to the angle between the individual stator winding and the winding of the rotor. Accordingly, the position of a shaft connected to the rotor will be represented by the potentials produced across these windings. The three windings are joined at one end in the form of a Y-connection. The other end of winding 1 is connected to ground and the other ends of windings 2 and 3 provide the inputs to the circuit of this invention represented generally at 4. The circuit 4 includes a first amplifier 5 and a second amplifier 6 and the inputs of these amplifiers are connected to the windings 2 and 3 of synchro S through respective resistors 7 and 8. A feedback resistor 9 is connected between the output and input of amplifier 5 and a feedback resistor 10 is connected between the output and input of amplifier 6. Cross-coupling between the amplifiers is provided by a resistor 11 connected between the output of amplifier 5 and the input of amplifier 6.

All of the resistors in the circuit 4 are preferably of the precision type with close tolerances and the amplifiers 5 and 6 are such as to produce very low distortion in the operating ranges thereof and are of extremely high gain, of the order of several hundred million. The input terminals of these amplifiers are substantially at ground potential and the input impedances are so high that the current flow therein, in response to externally applied potentials, is so low that it may be disregarded.

In accordance with an important features of this invention, resistors 7, 8 and 9 are of equal value, the resistor 11 has a value twice that of resistor 9 and resistor 10 has a value $2/\sqrt{3}$ times the resistance value of resistor 9. Stated otherwise, the feedback coupling for amplifier 6 is $\sqrt{3}/2$ times that for amplifier 5 and the cross-coupling is ½ that of the feedback coupling for amplifier 5. By such a judicious proportioning of resistor values, the circuit 4 is responsive to the potentials received from the synchro S to produce, at its respective outputs 12 and 13, potentials proportional respectively to the sine and cosine of the synchro rotor winding position relative to the stator or proportoinal to the sine and cosine of the displacement angle.

It is clear that, because amplifier 5 is a phase inverting amplifier, the output potential at terminal 12 of the circuit 4 is an inversion of the potential applied to its input. Thus, the signal $E \sin \theta \sin wt$ appearing at its input will be inverted to $-E \sin \theta \sin wt$ at its output terminal 12.

With regard to the performance of amplifier 6, it should first be noted that the general expression for performance of amplifier circuits of this type and having plural inputs is:

$$e_o = -R_o \sum_{i=1}^{n} \frac{e_i}{R_i}$$

wherein
$e_o$=output potential
$R_o$=resistance of feedback resistor
$e_i$=input potential
$R_i$=input resistance.

Accordingly, the equation of performance of amplifier 6 is:

$$e_o = \frac{-2}{\sqrt{3}} R_8 \left[ \frac{E \sin (\theta + 60°) \sin wt}{R_8} + \frac{-E \sin \theta \sin wt}{2R_8} \right]$$

since resistance values of resistor 10 is $2/\sqrt{3}$ times resistor 8 and resistor 11 is twice as large as resistor 8. Also, it should be noted that the potential produced by stator winding 2 is $-E \sin wt \sin (\theta + 240°)$. The latter expression is equal to $E \sin wt \sin (\theta + 60°)$.

Thus, $$e_o = \frac{-2}{\sqrt{3}} E \sin wt \left[ \sin \theta \cos 60° + \cos \theta \sin 60° - \frac{1}{2} \sin \theta \right]$$

$$= \frac{-2}{\sqrt{3}} E \sin wt \left[ \sin \theta \left(\frac{1}{2}\right) + \cos \theta \left(\frac{\sqrt{3}}{2}\right) - \frac{1}{2} \sin \theta \right]$$

$$= -E \sin wt \cos \theta$$

From the foregoing it is observed that the circuit 4 provides potentials proportional to $\sin \theta$ and $\cos \theta$ at its respective output terminals and, thus, performs the function of the Scott T transformer. This circuit, however, as well as being novel, possesses certain inherent advantages over the Scott T transformer as used in control systems.

Amplifiers 5 and 6 and all other associated components can be implemented by using only resistors, capacitors and solid state components thus reducing relative size and weight by a large factor. The accuracy of conversion can be very accurately determined since it is essentially determined by the ratios of one resistor value to that of all other resistors in the input, cross-coupling and feedback network.

From the foregoing, it is seen that a novel circuit has been provided with solid state components and which is capable of performing the function of translating three phase input signals to two phase output potentials. This circuit possesses certain inherent improvements over prior apparatus performing the same function in that it is relatively free of noise and harmonics present in such prior apparatus.

While the present invention has been described in a preferred embodiment, it will be obvious to those skilled in the art that various modifications can be made therein within the scope of the invention, and it is intended that the appended claims cover all such modifications.

What is claimed is:

1. An electrical circuit comprising a pair of summing amplifiers each including a feedback coupling from the output to the input thereof, cross coupling between the output of one of said amplifiers to the input of the other amplifier, the feedback coupling of said other of said amplifiers being $\sqrt{3}/2$ times the feedback coupling of said one amplifier, the cross coupling being one-half that of the feedback coupling of said one amplifier, and impedance means in the input to each of said amplifiers being substantially equal to each other, whereby said circuit is effective to translate input electrical signals represented by the expressions $E \sin \theta \sin wt$ and $E \sin (\theta + 60°) \sin wt$ wherein E is the signal amplitude, $\theta$ is a variable angle, $w$ represents the carrier frequency and $t$ is elapsed time, potentials proportional to $E \sin \theta \sin wt$ and $E \cos \theta \sin wt$, respectively, at the output thereof.

2. An electrical circuit according to claim 1, wherein said coupling means and impedance means are resistors.

3. An electrical circuit according to claim 2, wherein each of said impedance means is of a value substantially equal to the resistance value of the feedback coupling means of said one amplifier.

4. An electrical circuit according to claim 1, wherein said feedback couplings and cross coupling are resistive and the resistance values of the feedback coupling of said other amplifier and cross coupling are, respectively, $2/\sqrt{3}$ and 2 times the resistance of the feedback coupling of said first amplifier.

References Cited

UNITED STATES PATENTS

| | | | |
|---|---|---|---|
| 2,934,691 | 4/1960 | Logsdon | 321—57 |
| 3,219,834 | 11/1965 | Smithies | 307—83 |
| 3,244,961 | 4/1966 | Adler | 318—20.515 X |

LEE I. HIX, *Primary Examiner.*

G. GOLDBERG, *Assistant Examiner.*